United States Patent
Gauger

(10) Patent No.: US 9,751,405 B2
(45) Date of Patent: Sep. 5, 2017

(54) MODULAR CRUISE CONTROL DEVICE FOR A MOTOR VEHICLE

(71) Applicant: Robert Bosch GmbH, Stuttgart (DE)

(72) Inventor: Andreas Gauger, Brackenheim (DE)

(73) Assignee: Robert Bosch GmbH, Stuttgart (DE)

( * ) Notice: Subject to any disclaimer, the term of this patent is extended or adjusted under 35 U.S.C. 154(b) by 3 days.

(21) Appl. No.: 14/561,743

(22) Filed: Dec. 5, 2014

(65) Prior Publication Data

US 2015/0158385 A1    Jun. 11, 2015

(30) Foreign Application Priority Data

Dec. 5, 2013    (DE) .................. 10 2013 224 985

(51) Int. Cl.
| | |
|---|---|
| *B60T 8/32* | (2006.01) |
| *G05D 1/00* | (2006.01) |
| *G06F 7/00* | (2006.01) |
| *G06F 17/00* | (2006.01) |
| *B60K 31/00* | (2006.01) |
| *B60W 50/00* | (2006.01) |
| *B60W 10/06* | (2006.01) |

(Continued)

(52) U.S. Cl.
CPC ............ *B60K 31/00* (2013.01); *B60W 10/06* (2013.01); *B60W 10/18* (2013.01); *B60W 30/143* (2013.01); *B60W 50/0098* (2013.01); *B60W 2050/0006* (2013.01)

(58) Field of Classification Search
CPC ... B60K 31/00; B60W 50/0098; B60W 10/18; B60W 30/143; B60W 10/06
USPC .......................................... 701/93
See application file for complete search history.

(56) References Cited

U.S. PATENT DOCUMENTS 6,078,859 A * 6/2000 Jastrzebski .......... B60K 31/047
123/352

FOREIGN PATENT DOCUMENTS

| DE | 4 439 424 | 1/1996 |
| EP | 0 992 412 | 4/2000 |
| WO | 2004/007230 | 1/2004 |

OTHER PUBLICATIONS

Gen Inoue et al., : Development of Crawl Control, SAE Technical Paper Series 2008-01-1227 (ISBN 978-0-7680-1631-4), 2008 World Congress, Detroit, Michigan, Apr. 14-17, 2008.*

* cited by examiner

*Primary Examiner* — Maceeh Anwari
(74) *Attorney, Agent, or Firm* — Norton Rose Fulbright US LLP; Gerard Messina

(57) ABSTRACT

A cruise control device for a vehicle includes a regulator to regulate an actual speed with respect to a predefined setpoint speed, using a modular configuration including a regulator core module and at least one add-on regulator module. The core module ascertains a setpoint longitudinal force to be induced on the vehicle, based on a predefined setpoint speed and an ascertained actual speed, and to transmit the setpoint longitudinal force to the at least one add-on module. An add-on regulator module triggers actuators, e.g., drive and/or braking systems, based on the setpoint longitudinal force, e.g., for inducing the setpoint longitudinal force. Functions necessary for implementing various cruise control functions can be available centrally in the core module, whereas functions, used only in certain cruise control functions, may be in add-on regulator modules. Such modularity may reduce development effort and the need for hardware resources. Cruise control functions for off-road use may be implemented and added to traditional cruise control functions.

17 Claims, 2 Drawing Sheets

(51) Int. Cl.
*B60W 10/18* (2012.01)
*B60W 30/14* (2006.01)

MODULAR CRUISE CONTROL DEVICE FOR A MOTOR VEHICLE

RELATED APPLICATION INFORMATION

The present application claims priority to and the benefit of German patent application no. 10 2013 224 985.3, which was filed in Germany on Dec. 5, 2013, the disclosure of which is incorporated herein by reference.

FIELD OF THE INVENTION

The present invention relates to a cruise control device, sometimes also referred to as a cruise controller, for a motor vehicle.

BACKGROUND INFORMATION

A variety of driver assistance systems, which should regulate the speed of a motor vehicle and may thus support the driver in certain driving situations, are known. Such driver assistance systems use a cruise control device for implementing cruise control functions, such a device being suitably triggered to adjust the actual speed of the motor vehicle, by regulating it to the setpoint speed, based on a setpoint speed of the motor vehicle to be predefined and actual variables to be measured, for example, an engine of the motor vehicle or brakes of the motor vehicle.

Driver assistance systems have been developed for use in road traffic, for example. Such driver assistance systems typically regulate the speed of the motor vehicle in higher speed ranges. Driver assistance systems have been developed, which specifically take into account the requirements for driving off-road. Such driver assistance systems are typically configured for speed control in low speed ranges.

To influence the actual speed of the motor vehicle, a cruise control device may make use of various actuators, i.e., controllers. Patent documents DE 4 439 424 C1 and U.S. Pat. No. 6,078,859, for example, discuss cruise control functions in which a drive actuator is triggered for regulating the speed of the motor vehicle. Patent document EP 0 992 412 B1 discusses a cruise control function, which triggers only one brake actuator, for example, to influence a vehicle speed during a downhill drive. Patent document WO 2004/007230 A1 discusses a method for controlling the speed of a vehicle, in which both a drive actuator and a brake actuator are triggered. Several cruise control functions, which have been adapted and/or combined specifically for off-road use, are discussed in Gen Inoue et al.: Development of Crawl Control, SAE Technical Paper Series 2008-01-1227 (ISBN 978-0-7680-1631-4), 2008 World Congress, Detroit, Mich., Apr. 14-17, 2008. Depending on the use range of the respective cruise control functions and the actuators triggered, a driver is at least partially relieved of work on the gas pedal and/or brake pedal in certain driving situations and is able to concentrate better on steering the motor vehicle.

SUMMARY OF THE INVENTION

Specific embodiments of the present invention advantageously enable a cruise control device with the aid of which various cruise control functions may be implemented more easily than was previously the case. Specific embodiments of the cruise control device described here in particular make it possible for the cruise control device to be easily adaptable to various purposes, in which development work and/or requirements of hardware resources may be minimized.

According to one aspect of the present invention, a cruise control device for a motor vehicle is provided, having a regulator for regulating an actual speed with respect to a predefined setpoint speed of the vehicle. The cruise control device is characterized in that the regulator is configured to be modular, having a regulator core module and at least one add-on regulator module. The regulator core module is configured to ascertain a setpoint longitudinal force to be achieved on the motor vehicle, based on a predefined setpoint speed, and an ascertained actual speed, and to transmit the setpoint longitudinal force to the add-on regulator module. The add-on regulator module is configured to trigger actuators in the motor vehicle, based on the setpoint longitudinal force, in a manner suitable for inducing the setpoint longitudinal force.

Ideas about specific embodiments of the cruise control device provided here may be regarded as based on the ideas and findings described below, among others:

Traditional cruise control devices may be developed specifically for a single purpose. Different regulating algorithms are typically used for different cruise control functions, their range of application being limited to those of the respective cruise control functions.

For example, a traditional cruise control for use in road traffic and at relatively high speeds is usually configured only to regulate a drive torque supplied by the engine of the motor vehicle, so that a measured actual speed is adjusted to a predefined setpoint speed. In the case of downhill cruise control, however, instead of triggering the engine, a braking system of the vehicle is triggered to prevent the actual speed of the vehicle from exceeding a predefined setpoint speed. In the case of cruise control functions configured specifically for off-road use at low speeds, influences which typically occur in off-road driving, such as increased wheel slip are taken into account, among other influences.

Each cruise control device developed traditionally for implementation of cruise control functions has components which have been adapted specifically to the desired cruise control function, but also components, which carry out functions common to all cruise control devices. Furthermore, each of these cruise control devices must be developed separately with regard to implementation and application in a vehicle and must provide certain hardware resources, such as sensors, processors and/or memories, for example, and requirements must be made of these hardware resources during development, for example, such as the signal transit time between hardware components.

It is now provided that a cruise control device be configured as a modular unit. The cruise control device should have a regulator core module and at least one add-on regulator module.

The regulator core module should be configured to be able to carry out functions which are required in implementation of a wide variety of cruise control functions. In particular the regulator core module should be configured to ascertain, in particular to calculate, a setpoint longitudinal force to be induced on the motor vehicle, based on a predefined setpoint speed and an ascertained actual speed of the motor vehicle. In other words, the regulator core module should be capable of ascertaining an actual speed of the motor vehicle and, by comparison with a setpoint speed predefined by the driver, for example, to ascertain which setpoint longitudinal force should be exerted on the motor vehicle to suitably adapt the actual speed to the setpoint speed. In ascertaining such a setpoint longitudinal force, the regulator core module may take into account different influencing variables such as information about a current weight of the motor vehicle, about an uphill grade or a downhill grade of a road currently being driven on, etc. The setpoint longitudinal force thereby ascertained may then be transmitted to the add-on regulator module and/or to multiple add-on regulator modules.

In this context, it is pointed out that a setpoint variable, for example, a setpoint longitudinal force, is not understood in general to be the variable, i.e., the force itself, but rather information about this variable. In other words, to be correct linguistically, one must speak of transmitting a piece of information about a setpoint longitudinal force, but for linguistic simplicity we usually speak of transmitting the setpoint longitudinal force.

Whereas the regulator core module should carry out basic functions which are required for implementation of various cruise control functions, each of the add-on regulator modules should be configured to trigger actuators in the motor vehicle in a suitable manner for inducing the setpoint longitudinal force based on the setpoint longitudinal force transmitted by the regulator core module. The add-on regulator module may be adapted specifically for implementation of a particular cruise control function, i.e., for example, to suitably trigger a brake of the motor vehicle, acting as an actuator to implement a downhill cruise control.

In particular multiple add-on regulator modules, which differ from one another with respect to regulating principles implemented therein, may be provided in the cruise control device. Regulating principles may be understood to include, for example, various methods of taking into account input variables, manipulated variables and/or influencing variables as well as an application of different algorithms for processing these variables. The regulating principles may be specially adapted to implement specific cruise control functions.

The cruise control device may have multiple add-on regulator modules, each of the add-on regulator modules being configured to suitably trigger another actuator from a plurality of actuators in the vehicle for inducing the setpoint longitudinal force. For example, a first add-on regulator module may be configured to trigger a first actuator, for example, in the form of a braking system, whereas a second add-on regulator module may be configured to trigger a second actuator in the form of a drive of the motor vehicle, for example, an internal combustion engine, to induce the desired setpoint longitudinal force. In general, an actuator may be understood to be a device which is able to act in a suitable manner in a motor vehicle to induce a longitudinal force on the motor vehicle.

For example, at least one add-on regulator module may be configured to trigger an actuator of a braking system of the motor vehicle to implement a function of a downhill cruise control, for example.

Alternatively or additionally, another regulator module may be configured to trigger an actuator of a drive system of a motor vehicle to implement, for example, a traditional cruise control function for maintaining the vehicle speed on a flat or ascending section of a road in particular.

In one particular embodiment, at least one add-on regulator module may be configured specifically for a cruise control during off-road driving. Such an add-on regulator module may be configured, for example, to detect additional measured values and/or to analyze them to improve the robustness of a cruise control to be used in off-road driving, for example. In the case of such an add-on regulator module, for example, it may be taken into account that the vehicle typically travels very slowly in off-road driving and/or a greatly increased slip may occur between the wheels of the vehicle and the ground and/or obstacles, which may briefly have a great influence on the prevailing speed of the motor vehicle, may be driven over.

At least one add-on regulator module may be configured to ascertain the actual speed of the vehicle and to transmit it to the regulator core module. For example, an add-on regulator module may determine a rotational speed of one or multiple wheels of the motor vehicle and ascertain from this the prevailing actual speed of the motor vehicle and transmit it to the regulator core module. Alternatively, corresponding measured variables may also be transmitted directly to the regulator core module, and the actual speed may be ascertained directly in the regulator core module.

In one particular embodiment, the add-on regulator module may be configured in particular to ascertain the actual speed taking into account a measured variable, which does not correlate with the rotational speed of one of the wheels of the motor vehicle. In other words, at least one of the add-on regulator modules of the cruise control device may be configured specifically not to ascertain the actual speed of the motor vehicle or at least to ascertain it not only in the traditional way, i.e., based on a rotational speed of at least one of the wheels of the motor vehicle, but alternatively or additionally, to also ascertain this actual speed, taking into account one or multiple other measured variables. For example, an actual speed or signals from acceleration sensors, taking into account GPS signals in addition, may be ascertained by optical measurement of changing distances from stationary objects, for example, and the like. In the case of use for driving off-road in particular, in which the wheels of the motor vehicle often "spin" with increased slip and thus do not allow a reliable determination of speed, such a method of taking into account other measured variables for ascertaining the actual speed may greatly improve the robustness of a cruise control function thereby implemented.

In another embodiment, at least one add-on regulator module may be configured to suitably trigger not only one but at least two actuators having different functions in the motor vehicle for inducing the setpoint longitudinal force. For example, the add-on regulator module may trigger both a braking system and a drive of the motor vehicle, to support the driver when starting on an uphill grade and then driving further at a low speed, as is often the case when driving off-road, in the case of a cruise control function. In this example, the braking system should reduce the braking torque, for example, in synchronization with a drive torque instantaneously being supplied by the drive to allow starting of the vehicle without first rolling back.

The regulator core module and the at least one add-on regulator module may be interconnected in the cruise control device via at least one detachable interface. The interface may be configured in such a way that the add-on regulator module may be reversibly connected to the regulator core module to be able to exchange data and signals between these two modules, for example. The add-on regulator module may also be separated from the regulator core module via the detachable interface, for example, to test each of the modules separately and/or be able to replace them, if necessary.

It is pointed out that possible features and advantages of a cruise control device according to the present invention are described herein with reference to different specific embodiments. Those skilled in the art will recognize that the various features may be combined or replaced in a suitable manner to arrive at additional specific embodiments of the present invention.

Specific embodiments of the present invention are described below with reference to the drawings, but neither the description nor the drawings are to be interpreted as restricting the present invention.

The figures are merely schematic and are not drawn true to scale. The same reference numerals in different figures denote the same features or features having the same effect.

DETAILED DESCRIPTION

Figure 1:
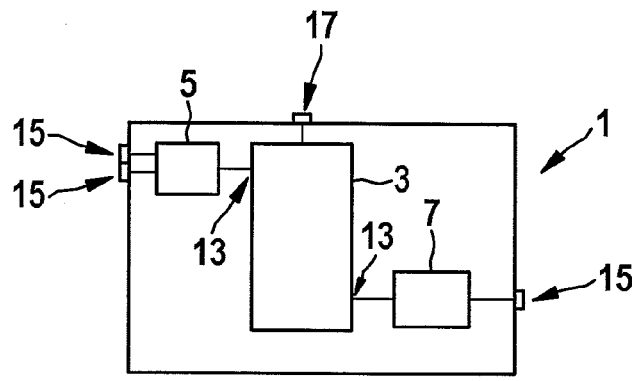
FIG. 1 shows an exemplary embodiment of a cruise control device according to the present invention.
Figure 2:
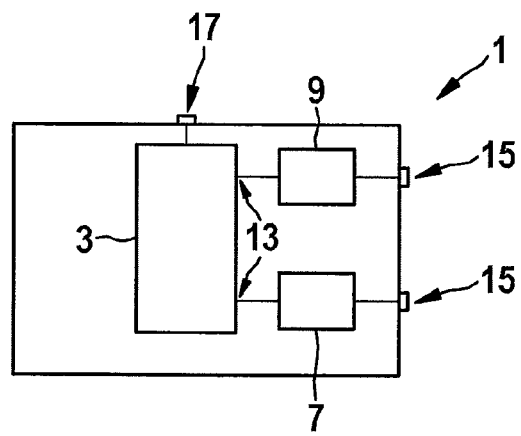
FIG. 2 shows an exemplary embodiment of a cruise control device according to the present invention.
Figure 3:
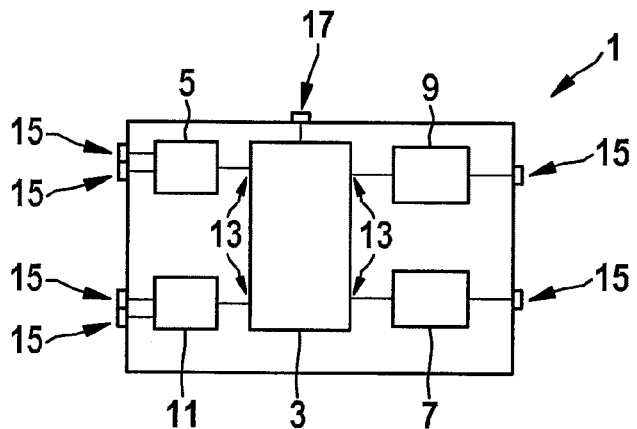
FIG. 3 shows an exemplary embodiment of a cruise control device according to the present invention.

FIGS. 1 through 3 show different embodiments of a cruise control device 1 according to specific embodiments of the present invention, each including a universally usable regulator core module 3 for cruise control functions having actuator-dependent and/or application case-dependent add-on regulator modules 5, 7, 9, 11, which also permit use in off-road driving in particular. Different expansion stages of certain cruise control functions are illustrated in the various figures.

FIG. 1 shows one specific embodiment of a cruise control device on the example of a downhill cruise control. Only one actuator of the motor vehicle, which acts as a brake actuator, is triggered via an add-on regulator module 7. The function implemented may thus be used exclusively for downhill driving. The speed of the vehicle cannot be maintained on a flat or ascending road. For an off-road driving application, regulator core module 3 is supplemented by an extra add-on regulator module 5. Robustness measures, for example, may be implemented in this add-on regulator module 5, taking into account requirements in typical off-road use with increased brake slip, traction slip and/or unevenness of the road.

Add-on regulator modules 5, 7 may be connected to regulator core module 3 via interfaces 13. Data or signals may be exchanged, i.e., sent or received, over interfaces or connections 15, which may be contacted from the outside on cruise control device 1. For example, actuators in the motor vehicle may be triggered via these interfaces or connections 15 or signals may be received from sensors in the vehicle. Regulator core module 3 is also able to exchange data with the outside via an interface or a connection 17.

FIG. 2 shows another specific exemplary embodiment of a cruise control device 1. In this example, the cruise control function implemented has the option of accelerating the vehicle as well as the option of decelerating the vehicle. For example, an actuator of the drive system may be controlled via an add-on regulator module 9 to accelerate the vehicle and thus increase a measured actual speed, which is too low, up to a setpoint speed. Conversely, a braking system of the motor vehicle may be triggered via an add-on regulator module 7 to be able to reduce an actual speed, which is too high, for example. The speed of the motor vehicle may thus be maintained, regardless of a road gradient. Comfortable regulation of speed, which is provided by the central regulator core module, among other things, is typically at the forefront of such a cruise control function. However, in the example shown in FIG. 2, there is no expansion for off-road driving since a traditional cruise control function is typically deactivated automatically when traction slip or brake slip occurs off-road.

FIG. 3 shows another specific embodiment of a cruise control device on the example of an off-road cruise control. Here again, both drive actuators and brake actuators are triggered via suitable add-on regulator modules 7, 9. In addition, regulator core module 3 is expanded to include, through additional add-on regulator modules 5, 11, beneficial functions in off-road driving and when starting from a standstill. Add-on regulator module 5 may again implement robustness measures for typical off-road use at low speeds, increased traction slip or brake slip and uneven road surface, for example. With the aid of add-on regulator module 11, measures may be taken to prevent the vehicle from rolling back when starting on uphill grades, for example. The driver may be relieved largely or even entirely of any pedal work in driving the vehicle as a result of these functions, which may permit increased comfort and safety when driving over difficult terrains. However, the functions may also be used for use in road traffic when the comfort-optimized regulator core module 3 is used.

Figure 4:
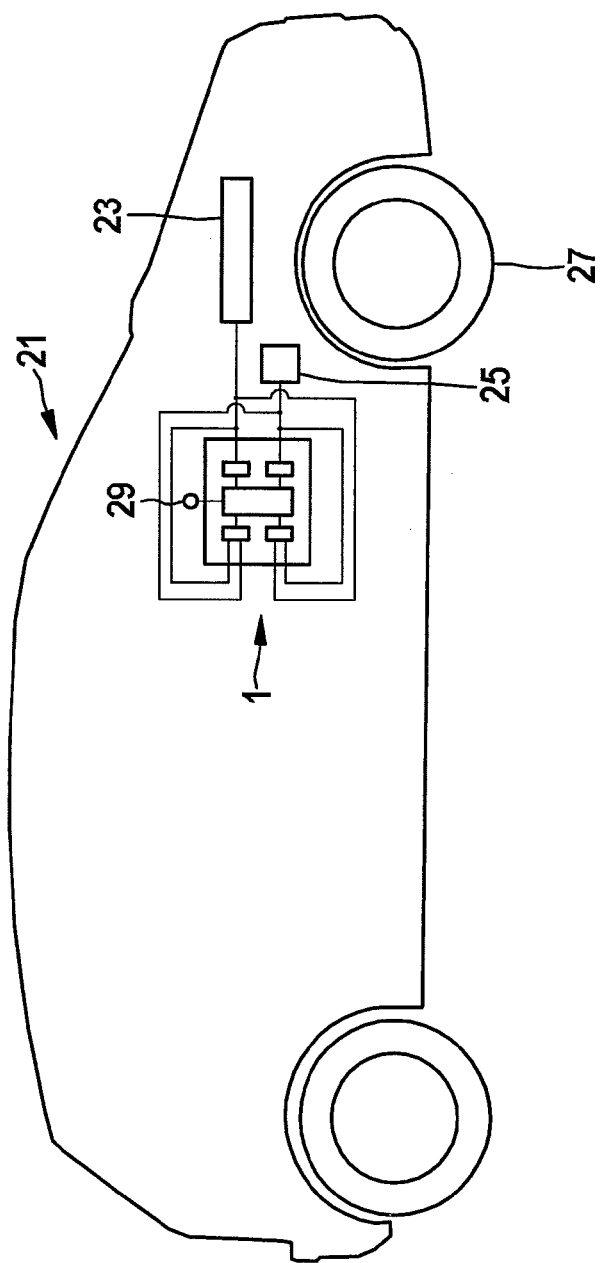
FIG. 4 shows a motor vehicle equipped with a cruise control device according to the present invention.

FIG. 4 shows a motor vehicle 21 having a cruise control device 1 according to the present invention used therein. Cruise control device 1 and the add-on regulator modules provided therein, are connected to different actuators in the vehicle or to control units, which control these actuators. For example, a drive system 23, which includes an internal combustion engine or an electric motor of the vehicle, for example, may be controlled. Furthermore, a braking system 25, which cooperates with wheels 27 of the motor vehicle, may be controlled. Furthermore, functions, which make it possible to determine an actual speed of the vehicle, may also be implemented in the vehicle, for example, in the aforementioned control units or with the aid of additional sensors or control units. For example, a rotational speed of at least one of wheels 27 may be ascertained for this purpose. Alternatively, to determine the actual speed and to increase the robustness of this determination, it is also possible to access additional measured variables to permit reliable determination of the actual speed in particular in off-road use with possible increased wheel slip. For example, a driver may predefine a setpoint speed to be maintained for the vehicle via an input device 29.

What is claimed is:

1. A cruise control device for a motor vehicle, comprising:
a regulator to regulate an actual speed with respect to a predefined setpoint speed of the motor vehicle;
wherein the regulator includes:
a regulator core module; and
at least one add-on regulator module,
the at least one regulator core module being configured to ascertain a setpoint longitudinal force to be induced on the motor vehicle, based on a predefined setpoint speed and an ascertained actual speed, and to transmit the setpoint longitudinal force to the at least one add-on regulator module,
wherein the at least one add-on regulator module is configured to trigger actuators in the vehicle for inducing the setpoint longitudinal force based on the setpoint longitudinal force, and wherein the regulator core module and the at least one add-on regulator module are physically separate and distinct modules interconnected via at least one detachable interface.

2. The cruise control device of claim 1, wherein there are multiple add-on regulator modules, wherein the add-on regulator modules differ from one another with respect to regulating principles implemented therein.

3. The cruise control device of claim 1, wherein there are multiple add-on regulator modules, each of the add-on regulator modules being configured to trigger a different actuator from a plurality of actuators in the vehicle for inducing the setpoint longitudinal force.

4. The cruise control device of claim 1, wherein at least one add-on regulator module is configured to trigger an actuator of a braking system of the motor vehicle.

5. The cruise control device of claim 1, wherein at least one add-on regulator module is configured to trigger an actuator of a drive system of the motor vehicle.

6. The cruise control device of claim 1, wherein at least one add-on regulator module is configured to ascertain the actual speed of the motor vehicle and to transmit it to the regulator core module.

7. The cruise control device of claim 6, wherein the add-on regulator module is configured to ascertain the actual speed, taking into account a measured variable, which does not correlate with a rotational speed of one of the wheels of the motor vehicle.

8. The cruise control device of claim 1, wherein at least one add-on regulator module is configured to trigger at least two differently acting actuators in the motor vehicle for inducing the setpoint longitudinal force.

9. A cruise control device for a motor vehicle, comprising:
a regulator to regulate an actual speed with respect to a predefined setpoint speed of the motor vehicle;
wherein the regulator includes:
a regulator core module; and
at least one add-on regulator module,
the at least one regulator core module being configured to ascertain a setpoint longitudinal force to be induced on the motor vehicle, based on a predefined setpoint speed and an ascertained actual speed, and to transmit the setpoint longitudinal force to the at least one add-on regulator module,
wherein the at least one add-on regulator module is configured to trigger actuators in the vehicle for inducing the setpoint longitudinal force based on the setpoint longitudinal force,
wherein at least one add-on regulator module is configured specifically for a cruise control during off-road use, and
wherein the regulator core module and the at least one add-on regulator module are physically separate and distinct modules interconnected via at least one detachable interface.

10. The cruise control device of claim 9, wherein there are multiple add-on regulator modules, wherein the add-on regulator modules differ from one another with respect to regulating principles implemented therein.

11. The cruise control device of claim 9, wherein there are multiple add-on regulator modules, each of the add-on regulator modules being configured to trigger a different actuator from a plurality of actuators in the vehicle for inducing the setpoint longitudinal force.

12. The cruise control device of claim 9, wherein at least one add-on regulator module is configured to trigger an actuator of a braking system of the motor vehicle.

13. The cruise control device of claim 9, wherein at least one add-on regulator module is configured to trigger an actuator of a drive system of the motor vehicle.

14. The cruise control device of claim 9, wherein at least one add-on regulator module is configured to ascertain the actual speed of the motor vehicle and to transmit it to the regulator core module.

15. The cruise control device of claim 14, wherein the add-on regulator module is configured to ascertain the actual speed, taking into account a measured variable, which does not correlate with a rotational speed of one of the wheels of the motor vehicle.

16. The cruise control device of claim 9, wherein at least one add-on regulator module is configured to trigger at least two differently acting actuators in the motor vehicle for inducing the setpoint longitudinal force.

17. The cruise control device of claim 9, wherein the regulator core module and the at least one add-on regulator module are interconnected via at least one detachable interface.

* * * * *